Dec. 28, 1948.  A. J. HORNFECK  2,457,558
MEASURING AND CONTROL SYSTEM
Filed March 20, 1944  2 Sheets-Sheet 1

Inventor
ANTHONY J. HORNFECK
By Raymond W. Jenkins
Attorney

Dec. 28, 1948.  A. J. HORNFECK  2,457,558
MEASURING AND CONTROL SYSTEM
Filed March 20, 1944  2 Sheets-Sheet 2
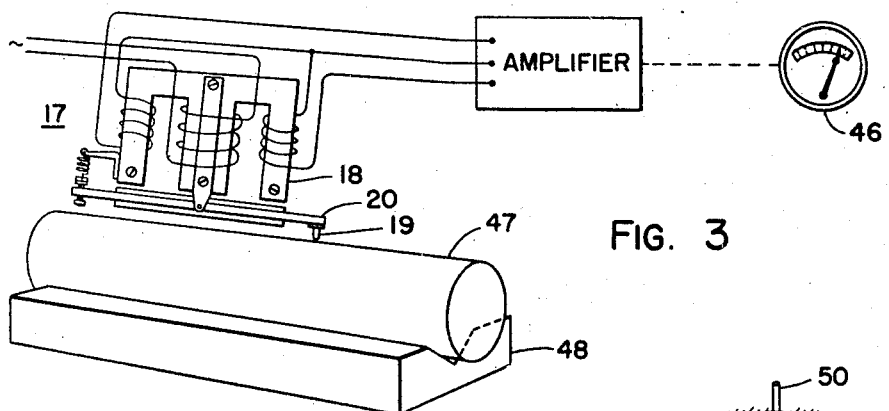
FIG. 3
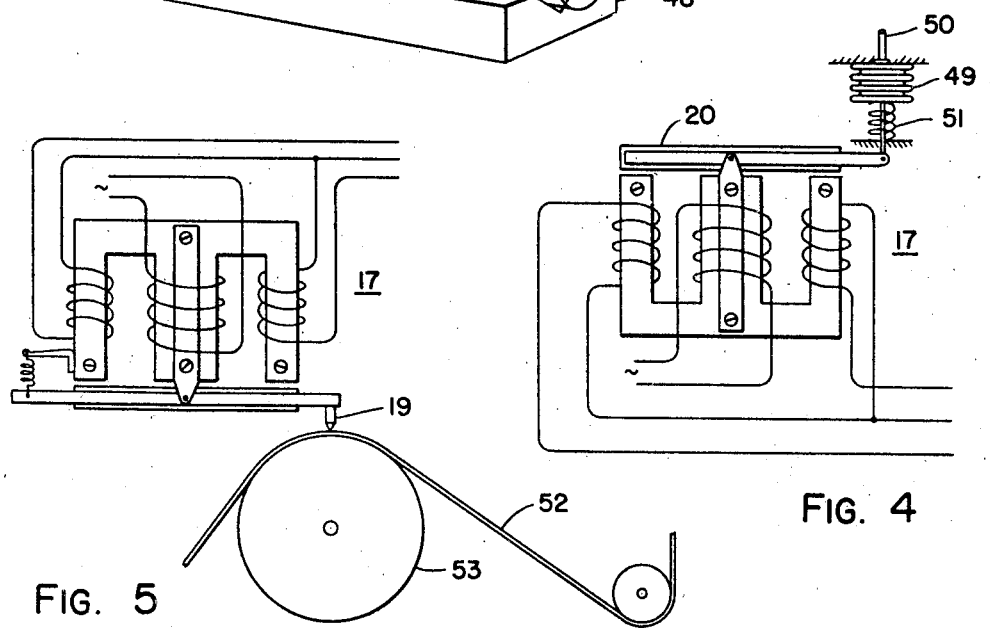
FIG. 4
FIG. 5
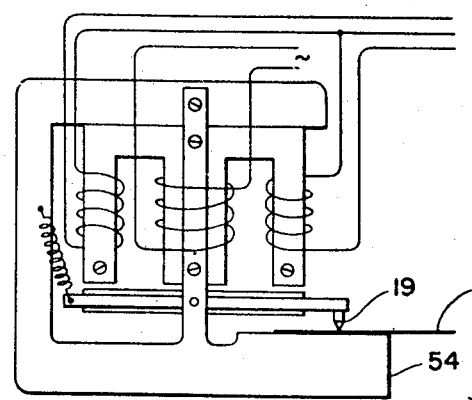
FIG. 6
Inventor
ANTHONY J. HORNFECK
By Raymond W. Junkins
Attorney Patented Dec. 28, 1948

2,457,558

UNITED STATES PATENT OFFICE 2,457,558

MEASURING AND CONTROL SYSTEM

Anthony J. Hornfeck, Cleveland Heights, Ohio, assignor to Bailey Meter Company, a corporation of Delaware Application March 20, 1944, Serial No. 527,308

2 Claims. (Cl. 82—14)

This invention relates to measuring and control systems and apparatus, and particularly to such apparatus useful in measuring minute forces, movements or dimensions. For example, I am able to detect movements in the order of 10 micro-inches (.00001 inch) and where such movements may be produced in any desired manner as representative of pressure changes, elongation of material, or the like.

As a preferred embodiment of my invention I contemplate an extremely sensitive and accurate tracer in a pattern controlled machine tool or what is commonly termed contour control.

A further object of my invention is to provide an instrument sensitive to very minute differences in dimension, such for example as irregularities in a machined surface or the thickness of a traveling sheet of paper or other materials.

Another object is to provide a means for detecting and accurately measuring fluid pressures or the like.

With these and further objects in view I will now describe certain preferred embodiments of my invention.

In the drawings:

Fig. 3 illustrates a surface analyzer.

Fig. 4 diagrammatically illustrates the measurement of a fluid pressure.

Fig. 5 diagrammatically illustrates the measurement of thickness of a traveling sheet of material.

Fig. 6 shows a modification of Fig. 5.

As is well understood by those familiar with the art in some machine tools, such as lathes, the tool is moved longitudinally and transversely of the work piece which, except for rotation about its center, remains stationary. In other machine tools, such as some types of milling machines, the work piece may be moved in two directions while the tool, except for rotation about its axis, remains stationary. In some other types of milling machines and in some die sinking machines the tool may be moved in one, two or three directions and the work piece also may be moved in one or more directions. In all instances it will be observed, however, that it is the relative movement between the tool and work piece that causes the work piece to be formed to a desired shape. As one specific embodiment of my invention I have chosen to illustrate and describe my invention incorporated in a lathe, wherein the work piece, except for rotation about its center, remains stationary and the tool is moved transversely and longitudinally thereof.

Figure 1:
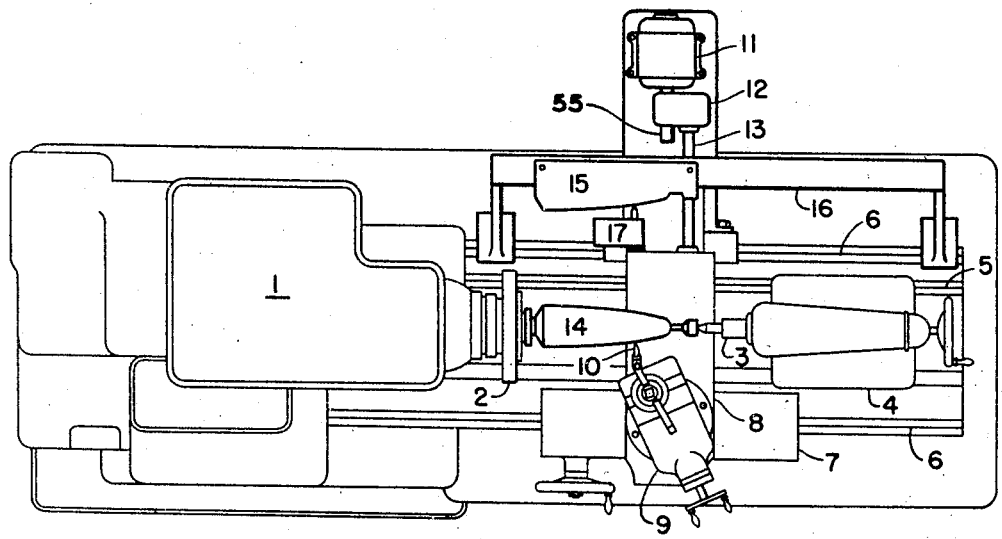
Fig. 1 is a plan view of a lathe embodying a contour control system.

Referring to Fig. 1, I show my invention applied to an engine lathe 1 having a head stock 2 adapted to be rotated at desired speed by any suitable means (not shown) and a tail stock 3. A carriage 4 is movable longitudinally along the bed of the lathe in suitable ways 5 and supports the tail stock 3. Also movable longitudinally along the bed of the lathe in suitable ways 6 is a carriage 7. Mounted on the carriage 7 is a cross-slide 8 movable on ways transversely of the bed of the lathe.

The cross-slide 8 is provided with an adjustable tool support 9 in which is secured a tool 10. An electric motor 11 drives through the necessary gear reduction 12 a worm or screw 13 for positioning the cross-slide 8 and tool 10 transversely of the bed of the lathe. Longitudinal movements of the tool 10, that is movements of the tool parallel to the center line of the lathe, are produced by means of the regular lead screw where uniform longitudinal speed of the tool is desired.

Supported by the head stock 2 and tail stock 3 is a work piece 14 which for illustrative purposes is shown as being formed to a parabolic shape by the tool 10. The particular shape has no significance, it being apparent as the description proceeds that by my invention a work piece may be formed automatically to any desired contour. A master template or cam 15 is rigidly held in parallelism to the work piece 14 upon any convenient extension 16 of the lathe bed. The profile of the master 15 is the contour which it is desired to reproduce upon the work piece 14. In Fig. 1 the taper of the work 14 follows in general a parabolic function merely as an example. For contacting and following the profile of the master 15 I provide a tracer assembly 17 rigidly mounted on and movable with the cross-slide 8. The assembly 17 is shown in larger and more diagrammatic fashion in Fig. 2 as having a three-legged core 18 which is firmly mounted to the cross-slide 8 and a tracer arm 19 carried by an armature 20.

Figure 2:
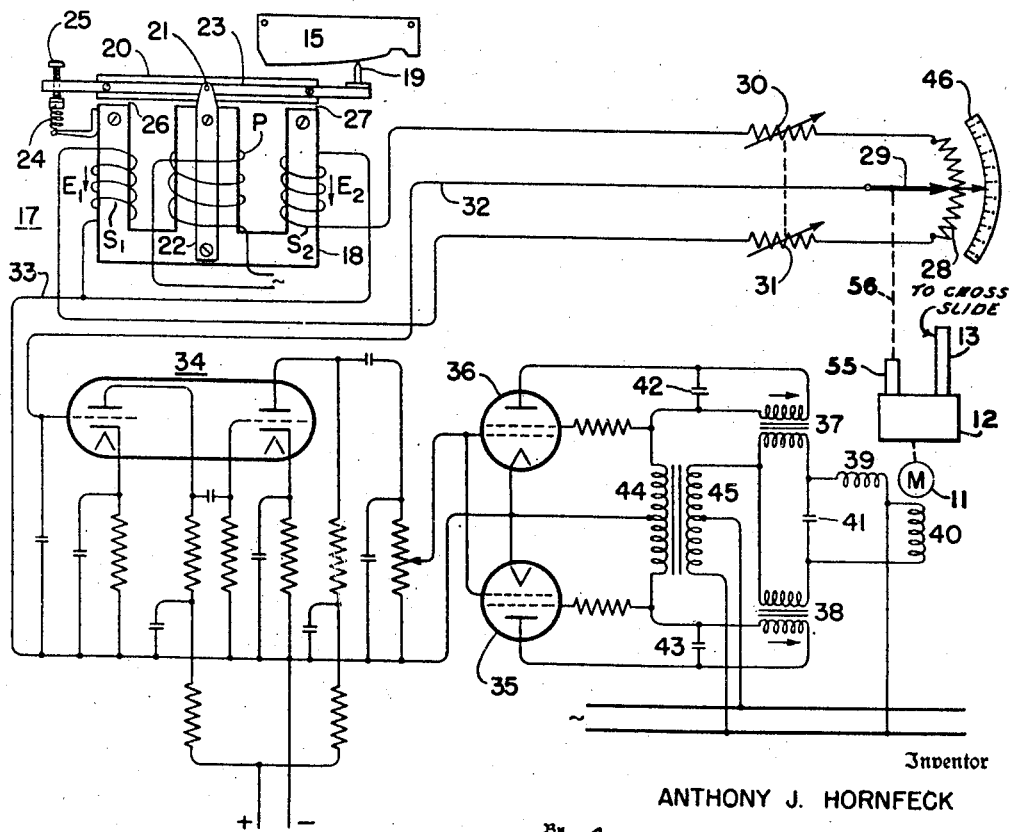
Fig. 2 is an electric circuit diagram in connection with Fig. 1.

In Fig. 2 I have not only shown the tracer assembly 17 to larger diagrammatic scale, but have shown the complete electrical circuit for controlling the motor 11 by the tracer arm 19 in such manner that the motor 11 will position the cross-slide 8, and consequently the tool 10 transversely of the lathe, or in other words toward or away from the work piece 14 as the tool 10 is traveling longitudinally. The action is such that if the contacted edge of the master cam 15 is a straight line parallel to the axis of the work piece 14, then the work piece 14 would be turned to cylindrical form. If the contacted edge of the master 15 is a straight line, but inclined relative to the axis of the work piece 14, then the work piece 14 will be shaped with a taper. The particular showing of Fig. 1 is in general a parabolic curve on the contacted edge of the master 15, and thus the form to be reproduced on the work piece 14.

The assembly 17 comprises a laminated yoke or core assembly 18 having a laminated armature 20 pivotally supported in relation to the yoke 18 as at 21 through non-metallic members 22, 23. The latter carries at one end the tracer arm 19 and at the other end is provided with spring biasing or loading means 24 having an adjusting screw 25. The purpose of the spring 24 and adjustment 25 is to provide a normal or neutral position of the armature 20 wherein the air gaps 26, 27 are of equal effect and to always maintain the tracer against the pattern. Upon angular movement of the armature 20 around the pivot 21 the one air gap 26 or 27 will be increased while the other air gap is decreased. This action, in addition to the moment arm of the tracer 19 relative to the pivot 21, provides desired amplification of the movement of the tracer arm 19 in terms of magnetic relation between the armature 20 and the yoke 18.

The yoke 18 is provided on its center leg with a primary winding P connected to an alternating current source. The two outer legs have oppositely wound secondaries $S_1$ and $S_2$ through which are induced voltages $E_1$ and $E_2$. The ratio of the two air gaps 26, 27 determines the ratio of the two voltages $E_1$ and $E_2$ induced in secondaries $S_1$ and $S_2$ from the primary P.

The electrical arrangement comprises a mutual inductor potentiometer bridge circuit wherein the tracer assembly 17 includes a 3-coil mutual inductor P, $S_1$, $S_2$. The bridge circuit in which the windings $S_1$ and $S_2$ are connected also includes the potentiometer or resistance winding 28 divided into two portions by the movable contact arm 29, and hand adjustable resistances 30, 31. It will be observed that the bridge including the windings $S_1$, $S_2$, and resistances 28, 30, 31 is not a conventional bridge to which a source of power is directly applied. The power supply is obtained through the magnetic coupling of armature 20 with yoke 18 between the primary energized winding P and the secondary windings $S_1$ and $S_2$. In a steady state of bridge balance the core piece or armature 20 is in the neutral or normal position with the air gaps 26, 27 equally effective. Displacement of the core piece 20 in one direction or the other unbalances the bridge and results in a potential being established in the conjugate conductor 32, 33 whose magnitude is representative of the magnitude of the change in position of the armature 20 while its phase is representative of the sense of change in the position of the armature 20. In other words, if the armature 20 were moved clockwise, then the potential in the conductor 32, 33 would be of one phase, while if the armature 20 is moved counter-clockwise the potential in the conductor 32, 33 would be of opposite phase.

The amplifier 34 is sensitive and responsive to the phase of the potential in the conductor 32, 33 for control of the motor control tubes 35, 36. Any movement of the armature 20 causes an unbalance of the bridge circuit and the direction and extent of unbalance is felt in the conjugate conductor 32, 33 and applied to the amplifier 34, which in turn controls the tubes 35, 36. The output circuits of the tubes 35, 36 are individually included in the circuits of saturating windings of saturable core reactors 37, 38 having alternating current output windings in a loop circuit including the motor windings 39, 40 and a capacitor 41.

The capacitor-run motor 11 is of a type wherein rotation is obtained in one direction when current flow is directly through the winding 39 and simultaneously through the winding 40 in series with the capcitor 41. Rotation in the opposite direction is obtained when current flow is directly through the winding 40 and is simultaneously through the winding 39 in series with the capacitor 41. Desired directional rotation of the motor 11 is accomplished by preponderance of saturation in the saturating windings of the reactors 37, 38. Whichever reactor predominates determines the direction of rotation of the motor, while the amount of predominance determines the speed of rotation.

Across the saturating winding of the reactor 37 I show a condenser 42. A similar condenser 43 is connected across the saturating winding of the reactor 38. These condensers smooth out the pulsating direct current from the motor control tubes 35, 36 so that the saturating windings of the reactors receive essentially a smooth direct current. Pulsating direct current from the tubes 35, 36 is half-wave rectification and the respective condenser discharges in the time interval between the successive pulsations thus tending to build up those valleys and tending toward a smooth direct current flow to the saturating windings rather than a definite pulsation or intermittent flow.

In order to obtain maximum sensitivity I have found that it is imperative that the saturating windings of the reactors 37, 38 have a high impedance, and that necessarily limits the current flow, for normally the current would be half-wave direct current with a large A.-C. component. Thus I have found that the use of the condensers 42, 43 is very important from a practical standpoint, particularly in obtaining high sensitivity.

The transformer 44 is an auto transformer having a winding 45 in series with the A. C. output winding of the reactors 37, 38 so that full voltage will be obtained to operate the motor 11, which is preferably a standard or commercial type of motor.

Whenever the profile of the master template 15 is parallel with the axis of the work piece the armature 20 will be in its neutral or normal position and the motor 11 not rotating. Upon a change in the profile of the cam 15, resulting in movement of the tracer arm 19 and consequent angular positioning of the armature 20 about the pivot 21, there will be an unbalancing of the bridge circuit resulting in a potential in the conjugate conductor 32, 33 of a phase depending upon the direction of movement of the armature 20 relative to the windings $S_1$ and $S_2$. Such unbalance of the bridge circuit results in a rotation of motor 11 in direction and at a speed dependent upon the direction of movement of the armature 20 and the extent of such movement.

The motor 11 in addition to positioning the tool 10 toward or away from the work 14 is also adapted to move the contact arm 29 relative to the potentiometer or resistance 28 for at least a partial balancing of the bridge circuit following an unbalance thereof. In other words, if the tracer arm 19 moves in one direction or the other, resulting in an unbalance of the bridge circuit and a rotation of the motor 11, then such movement of the motor 11 positions the arm 29 relative to the potentiometer 28 in proper direction to tend to rebalance the bridge circuit and stop the motor. This may be accomplished in any well-known manner; and, as shown in Figures 1 and 2, the gear box 12 could have a jack shaft 55 driven at a gear reduction ratio sufficient to permit the arcuate travel of the contact arm 29 in accordance with the travel of the cross slide 8. The jack shaft 55 may be connected to the contact arm 29 by any suitable means, such as shown by the dash-dot line 56. Under some conditions of operation a complete rebalancing may be desired. It is contemplated that the gearing between the motor 11 and the arm 29 may be so chosen that under certain conditions the motor would not be expected to completely rebalance the circuit, or in other words an insufficient movement (for rebalancing) of the contact arm 29 would be accomplished. The remaining balancing (simultaneously with the movement of the arm 29) would be accomplished by movement of the tracer assembly 17 relative to the template 15. Such movement of the assembly 17 is, of course, accomplished by movement of the tool 10 and cross-slide 8 on which the tracer assembly 17 is mounted. However, a partial rebalancing of the bridge circuit by the motor 11 would tend to prevent hunting or overtravel in case of sudden drastic changes in the profile of the template 15.

I further provide an extension to the arm 29 comprising an indicator pointer cooperating with a scale 46, which scale may be graduated in decimal parts of an inch representing departure of the tracer arm 19 from normal position, or may be graduated in other values as desired.

From the foregoing it will be evident that I have devised a tracer mechanism for contour control which is extremely sensitive, as well as being rugged and simple in construction. The device 17 takes a size of about 3x2x1 inches and may readily be mounted on and carried by the cross-slide 8 relative to the template 15. The balancing resistance 28 would normally be mounted at or near the motor 11 while the electrical amplifying apparatus between the assembly 17 and the motor 11 could be conveniently located near the lathe inasmuch as only electrical conductors interconnect the various parts. With the arrangement illustrated and described in Figs. 1 and 2 I have found it possible to detect deflections of the tracer arm 19 amounting to .00001 inch or less and through the agency of the motor 11 to duplicate tool operations readily to .0001 inch.

In Fig. 3 I illustrate a surface analyzer wherein the magnetic bridge transmitter 17 is arranged to have its tracer arm 19 scan the machined surface of a work piece 47 and indicate upon the indicator 46 the relative smoothness or roughness of the machined surface.

Preferably the work piece 47 would be mounted in a V-block 48, the latter resting on a surface plate. I have not felt it necessary to illustrate in Fig. 3 the usual tool room equipment for mounting the assembly 17 from the surface plate in manner such that the tracer point 19 may be moved along to scan the machined surface of the work 47. The scale of the indicator 46 may be graduated in micro-inches or whatever units desired, or the indicator 46 may be replaced by a recorder whose stylus or pen is positioned by the motor 11 relative to a time-driven recording chart, if such is desired.

In Fig. 4 I illustrate the magnetic bridge transmitter 17 having its armature 20 positionable by a bellows 49 receiving a fluid pressure through the pipe 50. Movement of the lower head of the bellows 49 may be loaded or opposed by a spring 51. Minute pressure differences within the pipe 50 and bellows 49 are translated into angular positioning of the armature 20 and amplified many times through the electronic amplifier described in connection with Fig. 2. The arrangement allows indication and/or recording of extremely minute pressures or variations in pressure not otherwise providing sufficient power or motion to accomplish an indicating of their value.

In Fig. 5 I indicate the adaptation of the magnetic bridge transmitter 17 to have its stylus or tracer arm 19 sensitive to variations in thickness of a traveling sheet 52 of paper, steel, or other material, as said sheet passes over a roll 53. This constitutes a thickness gage which may be continuously indicating or recording the thickness of the traveling sheet, and obviously the apparatus may be so connected as to control the thickness of the traveling sheet and maintain it at a desirable thickness if desired.

Fig. 6 shows another form which the thickness gage may take wherein the traveling sheet 52 continuously passes between the stylus or tracer arm 19 and anvil 54, the assembly being located at a desired location, between rolls for example. In this arrangement I eliminate any eccentricity or irregularities of the roll 53 which might cause movement of the tracer 19 (in the arrangement of Fig. 5).

While I have illustrated and described certain preferred embodiments of my invention it will be appreciated that other embodiments and arrangements are possible and that I am to be limited only as to the claims appended hereto.

What I claim as new and desire to secure by Letters Patent of the United States is:

1. In a duplicator for machine tools and the like having a relatively movable tool and work piece; a pattern having a shape corresponding to the desired shape of the work piece; a tracer for scanning the pattern and comprising a three-legged core member, one of said legs having an A. C. energized primary winding, the two remaining legs having each a secondary winding inductively energized from the primary, a movable armature piece carrying said tracer for varying the coupling between said windings, a resistor connected into a bridge circuit with said secondary windings and having an adjustable balancing contact, a reversible electric motor arranged to relatively move said tool and work piece and said tracer and pattern, means responsive to unbalance in said bridge circuit to regulate the speed and direction of said motor in accordance with the degree and direction of departure from balance, and an interconnecting drive between said motor and contact to provide movement of the contact by the motor tending to at least partially rebalance said bridge.

2. In a duplicator for machine tools and the like having a relatively movable tool and work piece; a pattern having a shape corresponding to the desired shape of the work piece; a tracer for scanning the pattern as the tool traverses the work, an electrical bridge having a balancing arm, bridge elements adapted to be unbalanced by movement of said tracer, a reversible electric motor arranged to relatively move said tool and work piece and said tracer and pattern, means responsive to unbalance in said bridge circuit to regulate the speed and direction of said motor in accordance with the degree and direction of departure from balance, and an interconnecting drive between said motor and balancing arm to provide movement of the balancing arm by the motor always toward a position to rebalance the bridge.

ANTHONY J. HORNFECK.

REFERENCES CITED

The following references are of record in the file of this patent:

UNITED STATES PATENTS

| Number | Name | Date |
|---|---|---|
| 2,025,748 | Howe | Dec. 31, 1935 |
| 2,050,629 | Quereau et al. | Aug. 11, 1936 |
| 2,088,659 | Moseley | Aug. 3, 1937 |
| 2,206,852 | Poupitch | July 2, 1940 |
| 2,221,516 | Hathaway | Nov. 12, 1940 |
| 2,240,184 | Hathaway | Apr. 29, 1941 |
| 2,270,991 | Bagno | Jan. 27, 1942 |
| 2,275,317 | Ryder | Mar. 3, 1942 |
| 2,285,540 | Stein et al. | June 9, 1942 |
| 2,307,503 | Gulliksen | Jan. 5, 1943 |
| 2,334,543 | Connolly | Nov. 16, 1943 |